June 24, 1930.  F. W. SPERR, JR  1,768,162
APPARATUS FOR TREATING GASES
Filed Jan. 29, 1926   3 Sheets-Sheet 3
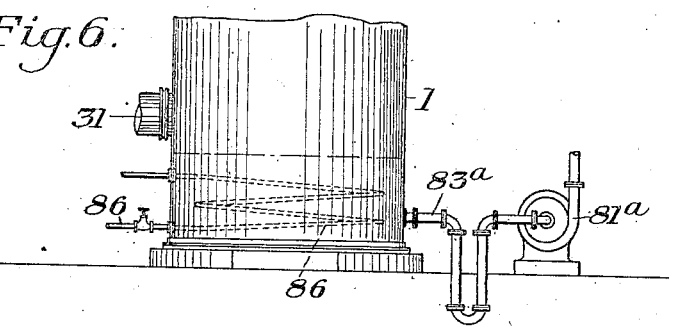
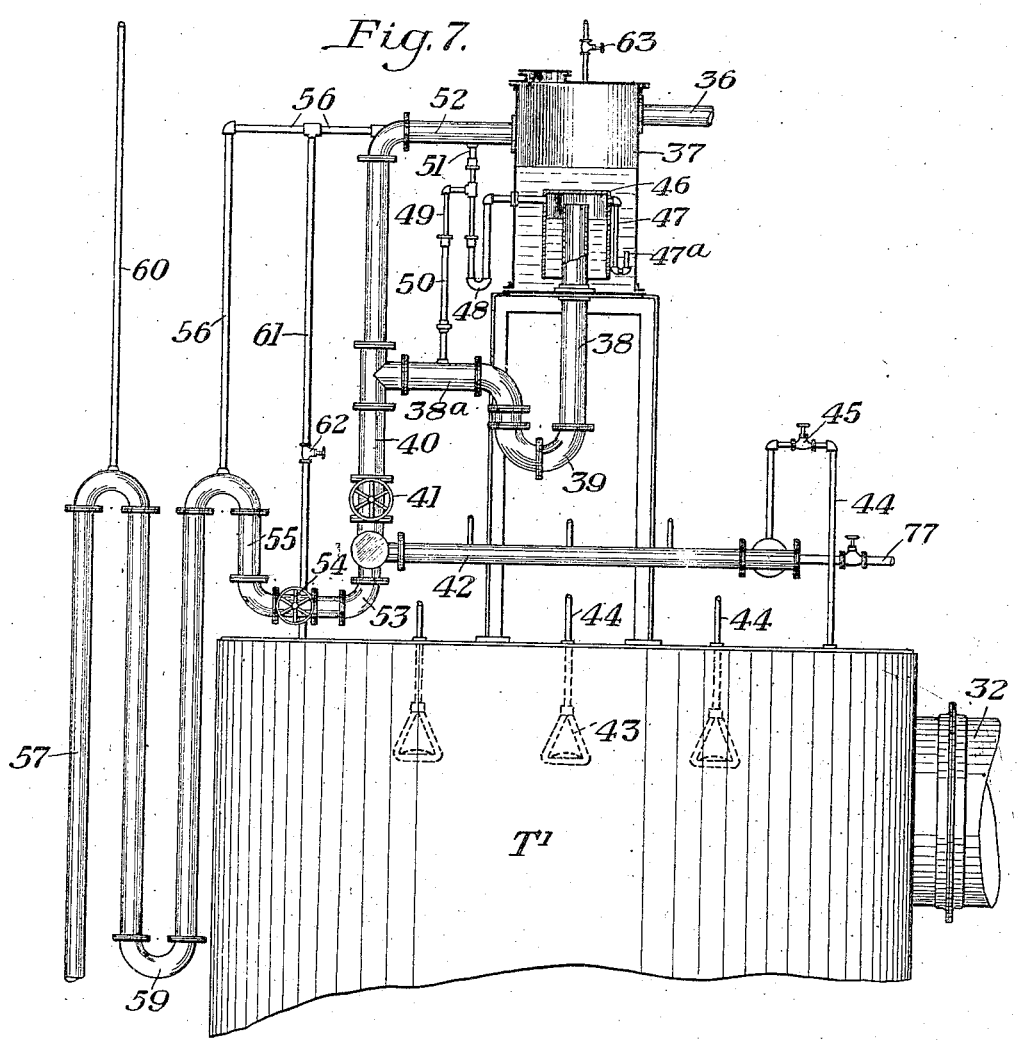
INVENTOR
Frederick W. Sperr, Jr.
by Byrnes, Stebbins & Pannely
his ATTORNEYS Patented June 24, 1930

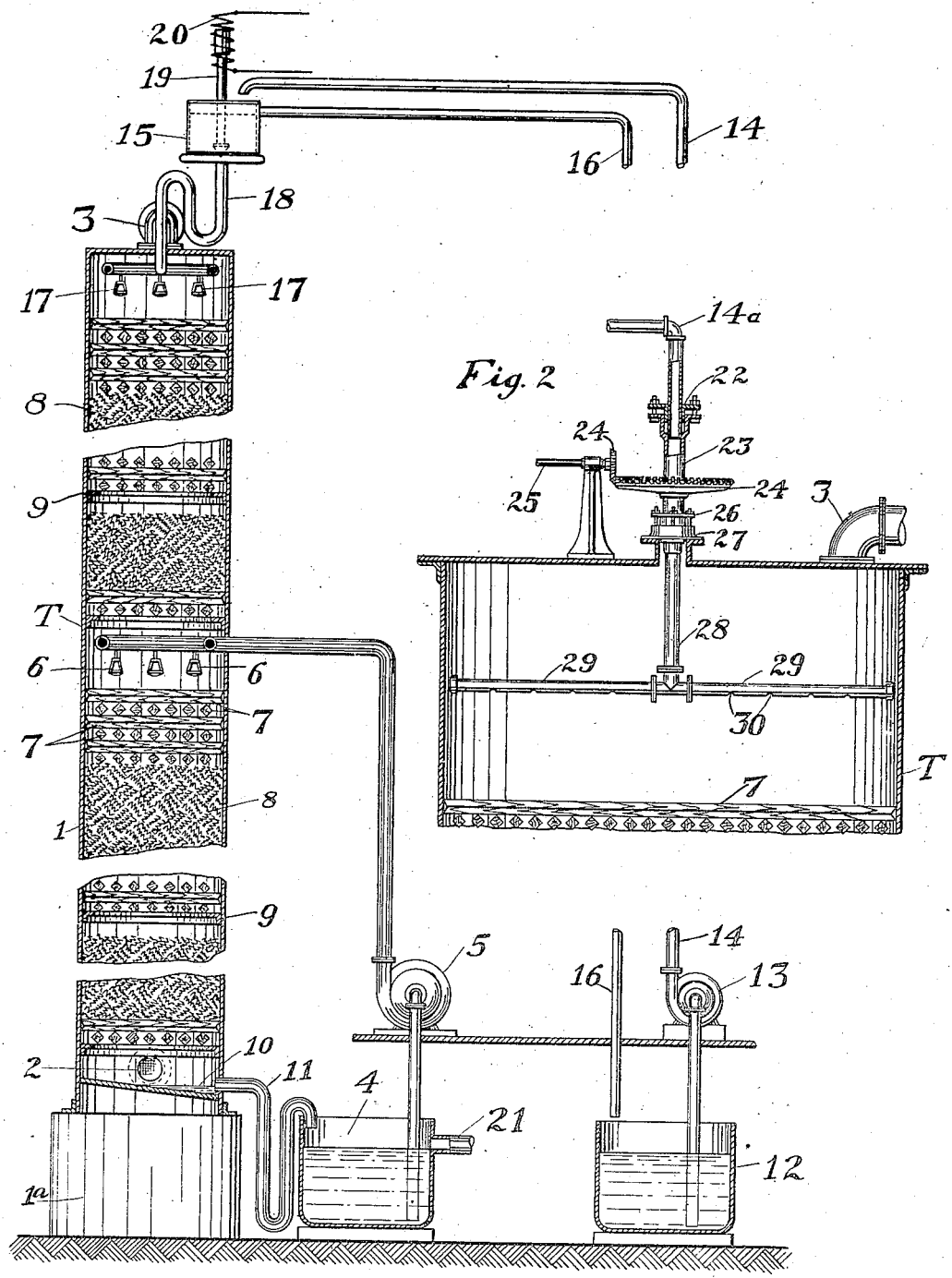

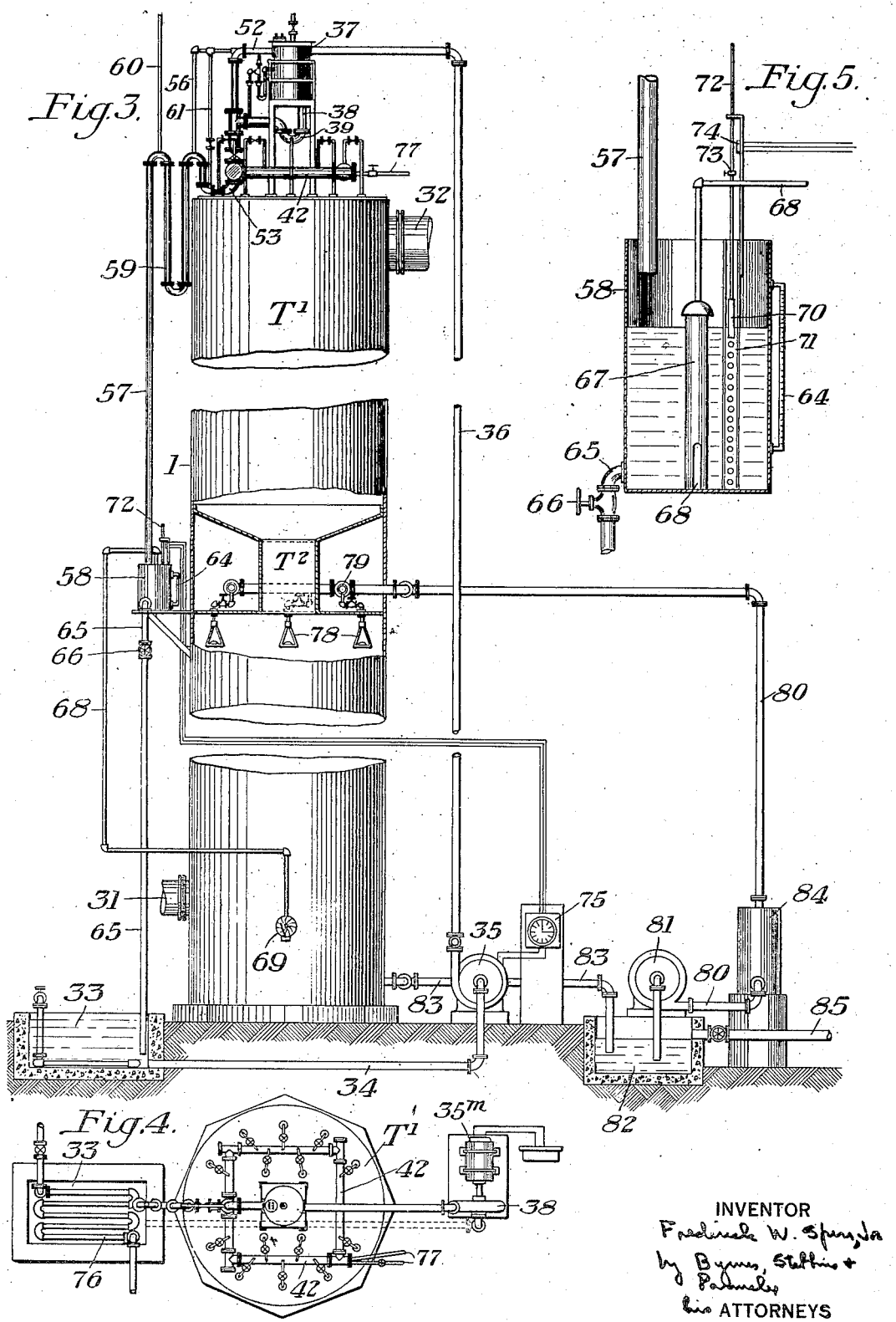

1,768,162

UNITED STATES PATENT OFFICE

FREDERICK W. SPERR, JR., OF PITTSBURGH, PENNSYLVANIA, ASSIGNOR TO THE KOPPERS COMPANY, OF PITTSBURGH, PENNSYLVANIA, A CORPORATION OF PENNSYLVANIA

APPARATUS FOR TREATING GASES

Application filed January 29, 1926. Serial No. 84,640.

This invention relates to apparatus for treating gases, and is particularly useful for the removal of napthalene and analogous hydrocarbons from fuel gases, such as coal gas, water gas, coke oven gas, and the like. It will be understood, however, that the invention has many other applications.

The present application is a division in part of my application Serial No. 4686, filed January 26, 1925, which has eventuated into Patent No. 1,578,687, dated March 30, 1926. As set forth in that application, it is highly desirable, in the treatment of fuel gas, to scrub the gas in a plurality of stages, using successively purer solvent in the several stages. Preferably, the operation is carried out in a tower through which the gas flows upwardly and a solvent which, for naphthalene removal, is generally an anthracene or petroleum oil, flows downwardly. The tower is divided into two or more stages, the lower stage or stages of the tower embodying a circulating system by which the solvent is continuously circulated. The upper portion of the tower is provided with means for intermittently supplying thereto a quantity of fresh solvent which flows down through the upper portion of the tower and mixes with the circulating solvent, thus keeping the same up to a proper standard of purity.

The tower is filled with a permeable contact material which has a large ratio of area to volume and is effective for retaining the solvent to a certain degree, distributing it over an exceedingly large area, and thereby insuring intimate contact with the solvent of all the gas. I provide as a contact material or filler for the scrubber steel turnings, which I have found are highly desirable for this purpose. These turnings are effective for causing an intimate contact of the gas with the solvent, and masses of this contact material are preferably used in connection with distributing means which spread the solvent over the entire mass of steel turnings.

The distributing means employed are preferably diamond hurdles which are made of wooden staves laid on edge. These staves are supported in the tower at spaced distances and in turn carry the several banks of steel turnings. When mounted in this manner there is no danger of the turnings being crushed together and the staves also act as distributing means which receive the solvent as it drips from the upper banks of the turnings and spread the same uniformly throughout the tower so as to prevent channeling of the solvent through the tower. Other arrangements of distributing means may be employed, such, for instance, as disclosed in my copending application, Serial No. 21,980, filed April 9, 1925.

Preferably the liquid is supplied to the tower by means which will insure a high rate of flow over the injection period. When this is done, the nozzles function properly and the desired distribution of liquid across the tower is secured. I have found that a siphoning means is extremely desirable for accomplishing this purpose and in a preferred embodiment of the invention the liquid is first supplied to a reservoir from which it is siphoned to the nozzles. The supply of liquid to the reservoir is controlled by a pump which is turned on at intervals by a suitable time controlled means.

A problem which is encountered in the practical operation of the siphoning device is the fact that the amount of liquid to be supplied to the tower in one "shot" varies from a number of causes. For example, in winter a materially smaller quantity is desired per shot than in the summer. I therefore provide a bypass line and a valve therein whereby the liquid supplied from the reservoir by the siphoning means may be divided in any desired proportion. The bypassed liquid is preferably supplied to a reservoir as this gives a visual indication of the action of the siphon and is an index to the amount of liquid supplied to the nozzles. Preferably, a trap is placed in the bypass line so that a suitable pressure may be maintained in the system.

I further provide for suitably heating the oil as this is of value in preventing condensation of moisture in the tower. Preferably the heating is carried out at least in part adjacent the nozzles for fresh oil, for example, in the header supplying the nozzles.

In the accompanying drawings which illustrates more or less diagrammatically certain preferred embodiments of the invention:

Figure 1 is a vertical section of a scrubbing tower and associated mechanism embodying the invention;

Figure 2 is a vertical section to an enlarged scale of the upper portion of a tower showing a modified form of distributing means;

Figure 3 is a side elevation, partly broken away, of a treating tower having the siphon apparatus for supplying liquid;

Figure 4 is a top plan view of the portion of the apparatus shown in Figure 3;

Figure 5 is a vertical section through the receiving tank employed for collecting the bypassed liquid;

Figure 6 is a side elevation of the bottom portion of a tower having a sump therein showing means for heating liquid in the sump; and Figure 7 is a side elevation, partly broken away, of the upper portion of the tower shown in Figure 3.

The tower shown in Figure 1 is indicated generally by the reference character T and consists of a shell 1 mounted on a foundation 1a. This shell is provided with a gas inlet pipe 2 at the bottom and a gas outlet pipe 3 at the top. The operation of the tower will be described with particular reference to the removal of naphthalene from fuel gas, although, as before stated, the tower is applicable to other uses.

The gas to be scrubbed is first subjected to operations wherein tar and ammonia have been removed and the gas has been subjected to the usual treatment of cooling and condensation. The gas reaches the tower through the opening 2 and passes upwardly to the opening 3, from which it is piped away. As the gas passes upwardly it comes in contact with a suitable naphthalene solvent, such as anthracene oil, which solvent is supplied from a tank 4 by a pump 5 supplying spray nozzles 6. These spray nozzles spread the solvent over the tower and as the solvent falls it comes in contact with diamond hurdles 7 which act as distributors and insure uniform distribution of the solvent over the entire cross sectional area of the tower. The hurdles are made of wooden staves, usually about one inch square, laid in rows as shown. It will be noted that the corner edges of one layer rest on the upper corner edges of the layer immediately therebelow. In making up the banks of diamond hurdles each may be constructed of from five to ten layers, although when they are used merely as supports for the intermediate banks of steel turnings a smaller number of layers may be used.

The solvent is distributed by the upper bank of diamond hurdles and falls onto a bank of steel turnings 8. These steel turnings are preferably in the form of spirals not exceeding one inch in diameter and not over approximately twelve inches long. It is desirable to limit the depth of each bank of steel turnings to approximately 4 or 5 feet, each bank being supported by a bank of diamond hurdles which, in turn, are carried upon supporting angles 9. In small towers the steel turnings may be depended on to support the diamond hurdles and other banks of turnings thereabove, but in large towers it is desirable, as shown in the drawings, to provide a suitable support 9 for each set of diamond hurdles.

The function of the steel turnings is to distribute the solvent over a very large surface and bring it into intimate contact with the gas. The turnings offer a very high percentage of free space and an unusually low resistance to the passage of the gas, while at the same time they present an enormous surface. They further tend to break up and mix the streams of gas in such a way as to attain a very high efficiency of contact. It will be clear, therefore, that not only is the solvent, in its downward passage, prevented from channeling and covering only a relatively small part of the cross sectional area of the tower, but the gas, in its upward flow, is also prevented from channeling so that very satisfactory operating conditions are achieved.

For contact purposes, it would be possible to obtain excellent results with steel turnings alone, once good distribution has been achieved, but, as above stated, it is desirable to limit the depth of each bank as otherwise they will tend to pack too closely and offer increased resistance to the flow of gas.

The solvent moves downwardly through the diamond hurdles and the steel turnings until it reaches the bottom of the tower and is collected at 10 from where it passes through a pipe 11 having a trap therein and goes to the tank for recirculation.

The function of the apparatus just described is to reduce the naphthalene content to such a point that the remainder may be removed by small quantities of oil directly applied. The recirculation is conducted at such a rate as to attain even distribution over the entire cross sectional area of the tower, and in practice this rate might be over 100 gallons per square foot of cross sectional area per hour. The gas passing upwardly through this portion of the tower has a large portion of the naphthalene removed therefrom and it is desired, in this stage, to reduce the naphthalene content to such a point that a final spray will remove the remainder. Therefore, when the gas passes the spray nozzles 6 it should not contain more than 15 to 30 grains per 100 cubic feet, depending upon the amount of naphthalene originally contained in the gas. If the gas originally supplied to the apparatus contains naphthalene in quantities less than 15 grains per 100 cubic feet the lower absorption stage may be done away with entirely and the last stage of absorption relied on to effect purification of the gas.

The upper portion of the tower is constructed just like the lower portion and consists of alternate banks of diamond hurdles and steel turnings. It is necessary, in this upper stage, to bring the gas into contact with fresh solvent containing no naphthalene or a very small amount thereof so that, for example, the vapor tension of such a solvent with respect to naphthalene will be less than the equivalent of two to three grains of naphthalene per 100 cubic feet of gas. It is always preferable to employ a perfectly fresh solvent, such as kerosene or gas oil which contains no naphthalene at all.

Since the amount of naphthalene to be removed in this stage of scrubbing is very low, the amount of oil required is also very small and the principal problem is to obtain an efficient distribution of this small quantity of oil over the tower filling so that it will come into uniform and intimate contact with a large quantity of gas. In order to accomplish this I inject oil at high rates for short periods of time and provide a permeable contact material, such as the steel turnings above referred to, for holding this solvent in the path of the gas. This principle of operation is set forth and claimed in the copending application of Eugene H. Bird, Serial No. 618,838.

The fresh solvent is supplied from a tank 12 by a pump 13 through a conduit 14 which discharges into a container 15 above the tower T. A return pipe 16 is provided and the rate of pumping is such that there is always a slight return flow, thus insuring the maintenance of a constant level in the container 15. Spray nozzles 17 are provided at the top of the tower and these nozzles are connected to the tank 15 through a conduit 18 having a trap therein. A valve 19 is provided and this is operated at timed intervals in accordance with the amount of solvent it is desired to inject into the apparatus.

The injecting step is preferably accomplished one or more times each hour and it may be readily carried out by supplying current intermittently to an electromagnet 20 adapted to actuate the valve 19. The electromagnet is connected to any desired time controlled switching means, a preferred form of which is described and claimed in the copending application of Alfred R. Powell, Serial No. 10,529, filed February 20, 1925.

When the valve 19 is open oil flows through the conduit 18 to the sprays 17. The oil flows down through the upper bank of diamond hurdles and is uniformly distributed over the tower and then passes through the steel turnings, where intimate contact of the gas and the oil is insured. The oil in the several parts of the tower apparently flows downwardly through the tower at about the same rate of speed so that there is always maintained in the upper portion of the tower a body of oil of substantially uniform depth which is moving downwardly through the tower. There may be one or more of these bodies of oil spaced apart from one another at varying distances, depending upon the time interval between operations of the valve 19. This fresh oil absorbs substantially all of the remaining naphthalene in the gas so that pure gas leaves the outlet 3. The contaminated solvent passes the spray nozzles 6 and mingles with the circulating solvent always up to a desired standard of purity. Fresh solvent is supplied as required to the tank 12 and contaminated solvent is taken off through an overflow 21 in the tank 4.

Another form of distributing apparatus which is of value is shown in Figure 2. The apparatus consists of a radial arm or arms revolving in a horizontal plane near the top of the tower T, these arms having spray openings through which solvent is continuously supplied. With this form of apparatus the solvent travels downward through the contact material in the tower in the form of a spiral film. Thus, with respect to conditions existing in any vertical radial plane in the tower T, the distribution of liquid is intermittent and the thickness and distance apart of successive films along such plane may be regulated by the quantity of liquid fed to the spray arms, the number and size of the holes, and by the rate of revolution of the spray system. In general such rates will be very low and the quantities of liquid small. This type of apparatus is particularly useful with towers of large diameter.

In this form of apparatus the feed pipe 14$^a$ is connected through a gland 22 to a revolving pipe 23. The pipe 23 is rotated through reducing bevel gearing 24 from a power shaft 25 and is supported by a bearing 27 having a gland 26.

Below the bearing 27 the pipe 23 is connected to a pipe 28 which in turn carries horizontal spray arms 29. The solvent flows from the pipe 14$^a$ through the pipes 23 and 28 into the spray arms 29 and escapes through openings 30 to be distributed over the diamond hurdles 7 in the tower. In order to compensate for the difference in area of the contact material over which holes 30 at different distances from the center of the tower must travel, the holes are preferably varied in area in proportion to their distance from the center; or by proportioning the distances from the center to successive holes in the ratio of the square roots of numbers 1, 2, 3, 4 and so on, the areas to which the spray openings 30 distribute solvent may be kept the same. For example, if the first hole were at a distance of one foot from the center, the next would be 1.414 feet, the next 1.732 feet, the next 2 feet, and so on. For convenience in construction and in order to make extremely low speeds of revolution unnecessary, the holes 30 may be placed alternately on the arms 29. When this is done there will be two concentric spirals of solvent moving down the tower.

In the embodiment of the invention illustrated in Figures 3 to 7 inclusive, there is shown a tower $T^1$ which is similar to the tower T of Figure 1 with the exception of the devices for controlling the oil feed. The tower packings are preferably the same and need not be again described. It will be noted that in the tower $T^1$ the upper and lower portions are separated by a restricted portion $T^2$. This is found to be desirable and it provides a convenient means for mounting the lower nozzles in an accessible manner.

In this embodiment of the invention gas to be treated enters at 31, passes upwardly through the tower and is discharged at 32. Fresh oil is supplied from a sump 33 through a conduit 34 to a pump 35 provided with a suitable controlling mechanism hereafter to be described. The liquid leaves the pump and travels upwardly through a conduit 36 through which it discharges into a closed reservoir 37. The reservoir 37 is provided with an outlet pipe 38 which extends upwardly into the reservoir and is provided with a trap 39. The portion $38^a$ of the conduit lies beyond the trap 39 and discharges into a conduit 40 which is provided with a regulating valve 41 and discharges in a header 42. The various spray nozzles 43 are connected to the header 42 by conduits 44 each provided with a valve 45 whereby the flow of liquid to the several nozzles may be adjusted.

That portion of the conduit 38 which projects into the reservoir 37 is covered with a seal pot 46 provided with a seal 47 and a trap 48. The trap 48 is connected to a vertically adjustable outlet 49 which is connected to the conduit $38^a$ through a conduit 50. Trap 48 is also provided with a vent 51 which terminates in a conduit 52 opening into the upper portion of the reservoir 37. The conduit 52 extends downwardly and terminates in the conduit 40 for which it acts as a vent and serves to equalize pressure conditions through the system.

There is provided a branch or bypass pipe 53 having a valve 54 therein for taking off a portion of the liquid discharged from the reservoir 37 through the conduit 38. The bypass 53 has an upstanding portion 55 provided with a vent pipe 56 leading back to the conduit 52 and is also provided with a discharge portion 57 terminating in a tank 58. As will be noted from Figure 5, the conduit 57 discharges at atmospheric pressure and a trap 59 is therefore provided for maintaining suitable pressure conditions in the apparatus. An atmospheric vent 60 is provided for preventing siphoning through the bypass line.

A vent pipe 61 connects the interior of the tower $T^1$ with the conduit 56 and thence with the reservoir 37. This equalizes the pressure conditions existing in the tower and the reservoir and assures suitable siphoning action. A valve 62 is provided in this conduit whereby it may be shut off if desired. A normally closed relief valve 63 is also provided for the reservoir 37.

It will be noted that the upstanding portion 55 of the bypass conduit stands at a higher level than the header 42 and also that the conduits 44 leading to the spray nozzles 43 extend upwardly from the header before they are directed downwardly into the tower. This means that there will always be liquid in the header 42 and the pipe 55.

Assuming that the reservoir 37 is substantially empty and that a certain amount of liquid is present in the trap 48 the operation is as follows: The pump 35 is started up and fresh oil is discharged from the conduit 36 into the reservoir 37. The liquid rises inside the seal pot 46 and also outside thereof, pressure conditions under the seal pot being maintained equal to pressure conditions in the reservoir by reason of the free communication afforded through the seal 47 which is then empty. This condition continues until the liquid level reaches the open end $47^a$ of the seal 47 at which time the seal becomes partly filled with liquid and therefore, since liquid is also present in the trap 48 and also in the trap 39, the air under the seal pot is trapped and becomes compressed as the liquid level continues to rise in the reversoir 37.

This continues until there is a sufficient pressure under the seal pot 46 to "blow" the trap 48, at which time the air under the seal pot passes off through the vent 51. The liquid rises rapidly in the seal pot and a siphoning action is set up whereby the liquid is supplied with extreme rapidity to the conduit 40 and thence to the header 42 and the nozzles 43. This principle of operation is shown in the patent to Chase No.

1,078,995. The siphoning operation continues until the liquid level falls to a point below the opening 47ª, at which time the seal 47 is sucked empty of liquid, and air enters the seal pot 46, breaking the siphon. Of course during the siphoning operation the trap 48 has again become filled with liquid so that the apparatus is again in condition for operation upon liquid being supplied in suitable quantity to the reservoir 37.

The siphoning apparatus above described is very effective, but it is difficult to make or maintain in suitable operating condition a siphon for operation on small quantities of liquid. The siphoning apparatus, in order to meet the operating requirements, will generally be effective for discharging 20 gallons of oil or upwards at each operation, although it is frequently desired to use considerably smaller quantities of liquid. For example, in winter operation of one tower constructed according to this invention, a "shot" of 10 gallons was desired. Also the amount of oil to be shot at one operation of the siphon may be varied from time to time in accordance with several conditions. The provision of the valve 54 and the bypass 53 gives the apparatus the desired flexibility of operation. By suitably regulating the valve 54 the liquid supplied from the reservoir 37 by the siphoning apparatus may be divided in any desired proportion, within limits, to the nozzles 43 and the discharge conduit 57. Therefore it is very easy to divide a discharge of 20 gallons from the reservoir into say 10 gallons to the nozzles and 10 gallons to the discharge conduit 57.

The reservoir 58 is preferably provided with a sight glass 64 by which the amount of oil flowing thereinto may be visually observed. If desired the sight glass may be graduated as shown to readily indicate the amount of liquid discharged through the conduit 57, thus making it easy to ascertain by this the amount of liquid supplied to the nozzles 43.

The tank 58 is provided with a discharge conduit 65 terminating in the sump 33. A valve 66 is preferably provided in this conduit whereby the rate of flow through the conduit 65 may be regulated. It may be desired to cut it off completely to measure the amount of liquid discharged through the conduit 57, but as will be apparent, if the valve 66 is set to permit emptying of the tank in a given time and is not adjusted thereafter, comparative results may be just as readily obtained.

In connection with the tank 58 there is shown a trap 67 having an opening 68 at the bottom thereof for communiation of liquid in the tank. As liquid rises in the tank, the air in the trap 67 is compressed and the pressure is transmitted through a conduit 68 to a recording gauge 69 of the usual type. This recording gauge is provided with a pin which draws a line on a travel chart. The peaks on the chart form a permanent record of the number of and the time interval between them, while the magnitude of the peaks are indexes of the quantity of liquid supplied to the nozzles. The second device comprises a float 70 operating in a perforated guide 71. The float carries a rod 72 having an adjustable electric contact 73 thereon adapted to cooperate with stationary contacts 74 for shutting off the pump 35.

A time controlled means indicated generally by the reference character 75 is used for turning on the pump motor 35ᵐ at desired time intervals.

In order to prevent condensation of moisture from the gas being treated in the upper part of the tower, it is desirable to heat the fresh oil for this purpose. Steam heating coils 76 are provided in the sump 33 but due to the fact that the header 42 remains full of oil between successive shots of the siphon, which shots may be an hour or so apart, I also provide for heating means in the header itself. I therefore provide a steam line 77 which runs through the header 42 and maintains the liquid therein at the desired temperature.

The operation of the tower T¹ is substantially the same as the operation of the tower T. The upper stage is for final purification and the lower stage or stages are for the removal of naphthalene in excess of a desired amount, generally 30 grains per 100 cubic feet. In the lower portion of the tower recirculated oil is supplied by spray nozzles 78, these nozzles being connected to a header 79 supplied with oil through a conduit 80. The conduit 80 receives liquid from a pump 81 drawing from a sump 82 which is supplied with oil from the bottom of the tower T¹ through a conduit 83. A heater 84 is preferably interposed in the conduit 80 so that the oil in the lower stage or stages of the tower may be maintained at desired temperature. The fresh oil passing downwardly through the tower maintains the recirculated oil up to a desired standard of purity and the excess is taken off through a discharge conduit 85.

In some instances it may be desirable to utilize the bottom portion of the tower in place of the sump 82 and this arrangement is shown in Figure 6. In this case the pump 81ª is connected to the bottom portion of the tower through a conduit 83ª having a trap therein. A steam coil 86 is used for heating the oil in the sump. The heating is of particular value during cold weather.

I have illustrated and described certain preferred embodiments of my invention, but it will be understood that the invention is not limited to the forms shown as it may be otherwise embodied within the scope of the following claims.

I claim:

1. A treating tower, including a reservoir, time controlled means for intermittently supplying liquid to the reservoir, means for controlling the flow of liquid from the reservoir to the treating tower, and means for bypassing a portion of the liquid discharged from the reservoir.

2. A treating tower, including a reservoir, means controlling the flow of liquid from the reservoir to the treating tower, and adjustable bypass means for taking off a portion of the liquid discharged from the reservoir.

3. A treating tower, including a reservoir, means controlling the flow of liquid from the reservoir to the treating tower, adjustable bypass means for taking off a portion of the liquid discharged from the reservoir, and a graduated receiver for the bypassed liquid.

4. A treating tower, including a reservoir, siphon means for controlling the flow of liquid from the reservoir to the treating tower, and a bypass for taking off a portion of the liquid discharged from the reservoir.

5. A treating tower, including a reservoir, means controlling the flow of liquid from the reservoir to the treating tower, a bypass conduit for taking off a portion of the discharged liquid, and a trap in the bypass conduit.

6. A treating tower, including a reservoir, means controlling the flow of liquid from the reservoir to the treating tower, a bypass conduit for taking off a portion of the discharged liquid, a trap in the bypass conduit, and a vent on the trap for preventing a siphoning action by the bypass conduit.

7. In combination, a treating tower, a reservoir, time controlled means for supplying liquid to the reservoir, means for accumulating liquid therein and for releasing it at a high rate of flow into the treating tower, and means for bypassing a portion of the released liquid.

8. In combination, a treating tower, a reservoir, time controlled means for supplying liquid to the reservoir, means for accumulating liquid therein and for releasing it at a high rate of flow into the treating tower, means for bypassing a portion of the released liquid, and means operated by the bypassed liquid to cut off the supply of liquid to the reservoir.

In testimony whereof I have hereunto set my hand.

FREDERICK W. SPERR, Jr.